United States Patent [19]

Gonzalez

[11] 4,425,935

[45] Jan. 17, 1984

[54] SNAP IN VALVE CARTRIDGE FOR PLUMBING FIXTURE

[75] Inventor: Teodoro J. Gonzalez, Mission Hills, Calif.

[73] Assignee: Price Pfister, Inc., Pacoima, Calif.

[21] Appl. No.: 379,931

[22] Filed: May 19, 1982

[51] Int. Cl.³ .............................................. F16K 43/00
[52] U.S. Cl. ................................ 137/315; 137/454.2; 137/454.6
[58] Field of Search .................... 137/315, 454.2, 454.6

[56] References Cited

U.S. PATENT DOCUMENTS 3,788,601  1/1974  Schmitt ......................... 137/454.6 X
4,005,728  2/1977  Thorp ........................... 137/454.6 X
4,226,260 10/1980  Schmitt .............................. 137/315

Primary Examiner—Harold W. Weakley
Attorney, Agent, or Firm—Fred Flam

[57] ABSTRACT

A plastic valve cartridge for a plumbing fixture can be installed in and removed from a valve casting without tools. One end of a valve cage has detent means that snaps into a cup of the casting. The cage extends across a cavity in the casting so that its other end fits a cylindrical inlet opening. Valve means carried by the cage include a closure having a stem comprising a pair of leaf spring arms releasably snap-fitted to a non-circular hole in a knob or handle. The cage is locked in position by a sleeve that interferes with the detent means of the cage. Key means allow the sleeve to be removed only when the valve is partly open, thus signalling by spout flow the desirability of shutting off the water supply to the fixture before the cartridge is removed.

21 Claims, 10 Drawing Figures

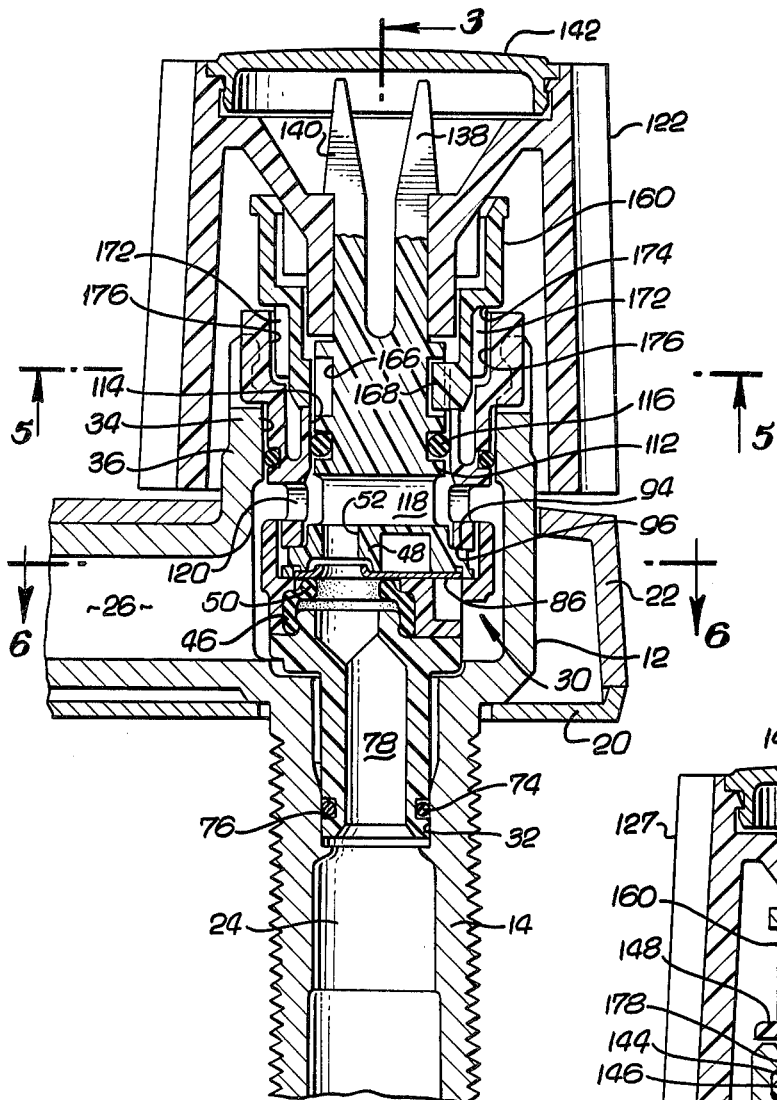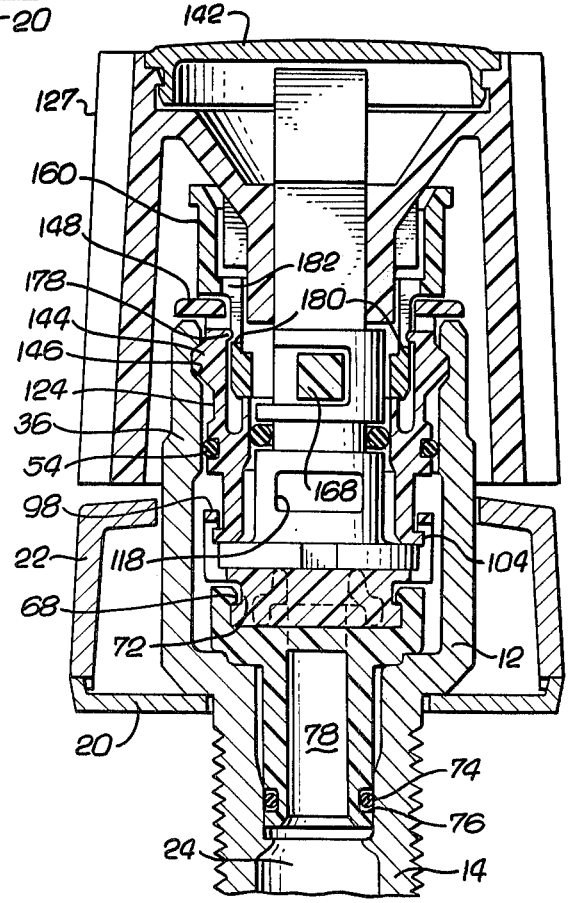

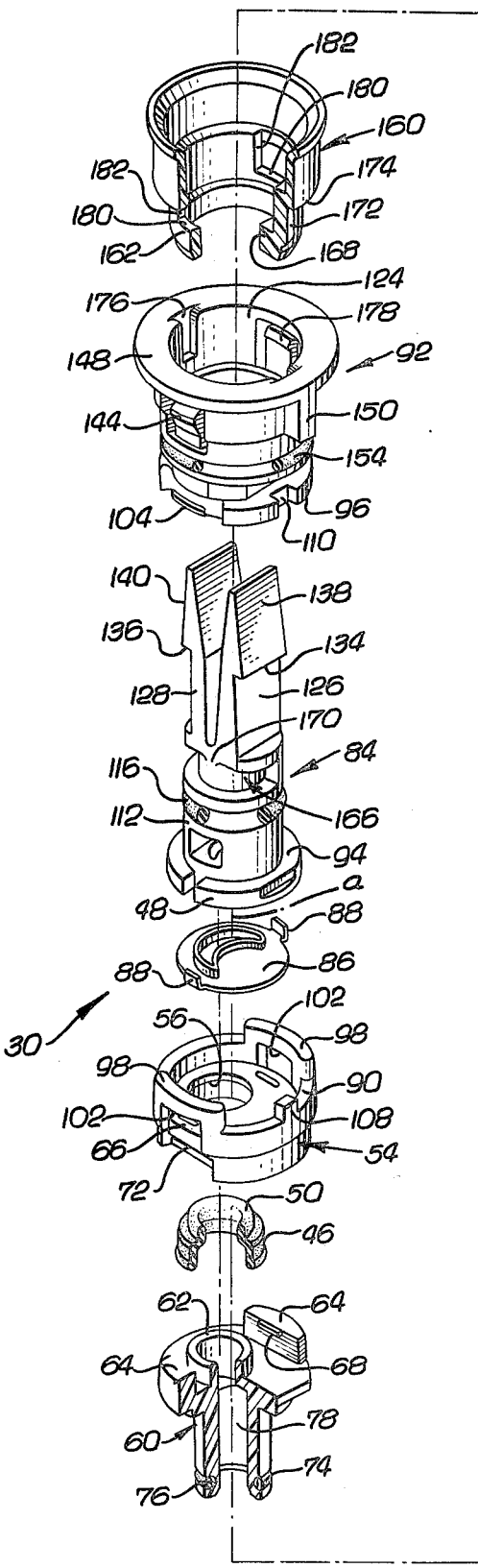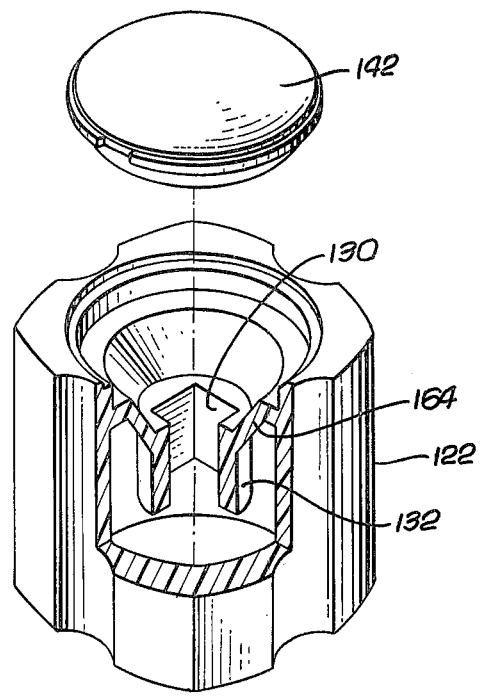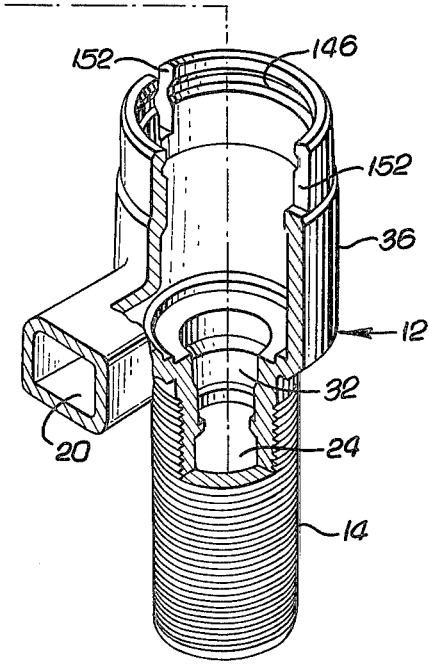
Fig. 4

SNAP IN VALVE CARTRIDGE FOR PLUMBING FIXTURE

FIELD OF THE INVENTION

This invention relates to plumbing fixtures, and particularly to a low cost, but effective plastic valve structure that can be installed, removed and replaced without hand tools of any kind. A valve structure of this character is shown and described in U.S. Pat. No. 4,109,672, issued Aug. 29, 1978 to Price-Pfister Brass Mfg. Co. of Pacoima, Calif. as assignee of Robert S. Szemeredi.

BACKGROUND OF THE INVENTION

The U.S. Patent to Szemeredi disclosed a useful plastic valve structure intended to facilitate the removal and replacement by a householder without any tools whatsoever. One of the problems in the Szemeredi device is that it requires the use of a key movable transversely of the valve recess cooperable with an undercut slot at one side of the brass body, and two rectangular holes at the opposite side of the brass body. Such slots and holes require somewhat costly machining operations that are desirably avoided. Furthermore, the Szemeredi valve structure requires the use of a bulbous seal member clamped or compressed against a ported inlet partition of the brass body. Proper seating of the static seal about the inlet required accurate location of the locking slots of the body with reference to the inlet partition.

Another annoyance with the Szemeredi structure is the forgetfulness of the householder. It is not uncommon for the householder to attempt removal of a plumbing valve without shutting off the water supply to the fixture. Once the Szemeredi valve is removed, large volumes of water may be released.

The primary object of this invention is to provide an improved valve structure, designed for installation, removal and replacement without tools, a valve structure that signals the presence of water pressure before removal, and a valve structure that requires only the simplest of machining operations on the brass body.

SUMMARY OF INVENTION

The foregoing objects are made possible by novel arrangements of parts, including an axially inserted key for locking the valve cage in place; a cylindrical axially aligned inlet opening of the valve body for cooperation with a plug-like part attached to the valve cage; an interlock between the key and the valve cartridge to prevent removal except when the valve is open, whereby flow through the spout signals the existence of water pressure; an improved latch between the handle and the operating stem of the valve; novel interfitting and polarized parts for securing the valve stem, seat holders and companion parts together with the valve cage.

BRIEF DESCRIPTION OF THE DRAWINGS

A detailed description of the invention will be made with reference to the accompanying drawings wherein like numberals designate corresponding parts in the several figures. These drawings are to scale.

FIG. 2 is an enlarged vertical sectional view through one of the valve structures, and taken along a plane corresponding to line 2—2 of FIG. 1.

FIG. 3 is a fragmentary axial sectional view similar to FIG. 2, but taken along a plane indicated by line 3—3 of FIG. 2, the handle being partially broken away.

FIG. 4 is an exploded view of the valve parts, and illustrating the manner in which they are assembled and fitted together.

DETAILED DESCRIPTION OF PREFERRED EMBODIMENT

The following detailed description is of the best presently contemplated mode of carrying out the invention. This description is not to be taken in a limiting sense, but is made merely for purposes of illustrating the general principles of the invention, since the scope of the invention is best defined by the appended claims.

Figure 1:
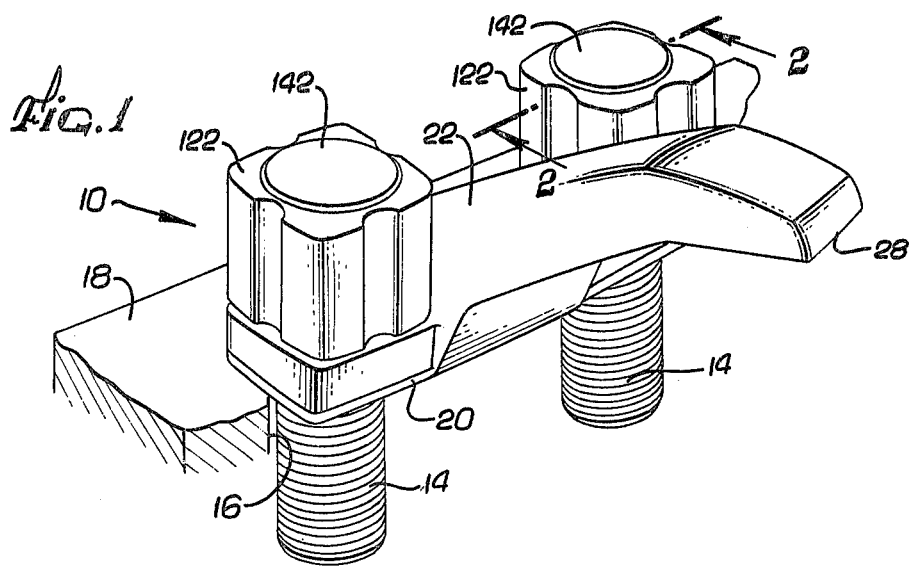
FIG. 1 is a front pictorial view of a dual valve fixture, in this instance for a lavatory, a part of the lavatory deck being broken away.

The fixture 10 illustrated in FIG. 1, is designed to service a lavatory 12. The main structure of the fixture is a fixture body or brass casting 12 having two inlet nipples 14 for hot and cold water that project through spaced apart holes 16 in the lavatory deck 18. A decorative base plate 20 and a decorative cover plate 22 enclose the brass casting.

FIG. 2 illustrates one side of the casting 12 and one of the inlet nipples 14. The nipple 14 provides an inlet passage 24 that opens upwardly into the main chamber 26 of the casting. In a like manner the chamber 26 communicates with the inlet passage at the opposite side of the casting. Suitable structures (not shown) conduct the water outwardly of the main chamber 26 to the spout 28 (FIG. 1).

Communication between the inlet passage 24 and the main chamber 26 is controlled by a valve cartridge 30, comprised of five parts molded of semi-rigid resilient plastic material. The lower end of the cartridge is fitted to a machined cylindrical recess 32 formed near the center of the nipple 14. The cartridge has access to the nipple passage 24 by way of a machined cylindrical opening 34 in a cup 36 formed at the top of the casting 12. The axes of the machined openings 34 in the cup 36 and of the recess 32 coincide. The cartridge 30 is made of material having the requisite flexibility and resilience to perform the functions hereinafter described.

The ultimate operative valve elements of the valve cartridge 30 are a generally tubular neoprene seal member 46 and a ported closure plate or disk 48 that engages a protruding upper lip 50 of the seal member 46. The closure disk 48 moves angularly about the valve axis a to wipe across the lip 50, thus selectively to register the seal member 46 with an eccentric control port 52 of the disk 48.

As shown best in FIG. 4, the seal member 46 is mounted in a plastic retainer 54 that forms one of the five plastic parts of the cartridge. The lower end of the retainer 54 provides a seal mounting aperture 56 located eccentrically. A shoulder 58 (FIG. 2) divides the aperture into a smaller diameter upper portion and a larger diameter lower portion to fit the correspondingly shaped upper and lower portions of the seal member 46.

The seal member 46 is confined in its aperture 56 by the aid of a plastic plug 60 which is the second of the five plastic parts of the cartridge. The plug 60 (FIG. 4) fits the under side of the retainer, and has a projection 62 that fits into the lower end of the seal member 46. The plug 60 has a pair of upwardly extending cylindrical segments 64 on diametrically opposite sides that fit corresponding recesses 66 in the lower end of the seal retainer 54. Detent bars 68 (See FIG. 3) on the inside surfaces of the cylindrical segments 64 snap into detent slots 72 of the retainer, thus to secure the parts together by releasable snap connection.

The plug 60 has its lower reduced end fitted into the cylindrical bore 32 of the nipple 14. An O-ring 74 in a peripheral groove 76 of the plug provides a static seal. The plug 60 provides a passage 78 to conduct inlet water to the working seal member 46. The passage 78 is offset at its upper end to provide appropriate registry.

The closure disk 48 is formed at the lower working end of a plastic valve stem 84. The valve stem 84 is the third plastic part of the cartridge structure. A thin metal facing 86 is adhered to and rotatably coupled to the disk 48 by radial projections 88 that fit in corresponding slots of the disk 48. The faced disk 48 fits a shallow recess in the upper end of the seal retainer 54. This recess is formed by a peripheral rim 90. The control disk 48 is confined in the recess by a cage 92 which is the fourth plastic part of the cartridge.

The cage 92 connects with the seal retainer 54 and the plug 60, in a manner to be hereinafter described. These three cartridge parts mount the operative valve elements in the casting 12. The cage 92 fits the casting cup 36 at the top while the plug fits the casting 12 at the bottom. The cage 92 is essentially tubular and guidingly mounts the stem 84. The stem 84 is assembled with the cage by inserting the stem into the lower end of the cage 92 until the rim 94 of the closure disk 48 abuts the lower end surface 96 of the cage 92 as shown in FIGS. 2 and 3. The seal retainer 54 snap connects to the cage 92 to hold the stem 84 and its closure disk 48 in position for operation. For this purpose, the rim 90 of the seal retainer 54 has a pair of arcuate projections 98 that provide detent holes or recesses 102 which engage arcuate detent bars 104 (FIG. 3) at the bottom of the cage 92. A projection 108 (FIGS. 2 and 4) cooperates with a slot 110 of the cage for proper angular alignment.

The stem 84 has an intermediate cylindrical part 112 that fits an intermediate cylindrical part 114 of the cage passage. An O-ring 116 provides a seal between these companion parts. A guided relationship between the closure disk 48 and the retainer rim 90 assists to stabilize the stem.

Figure 6:
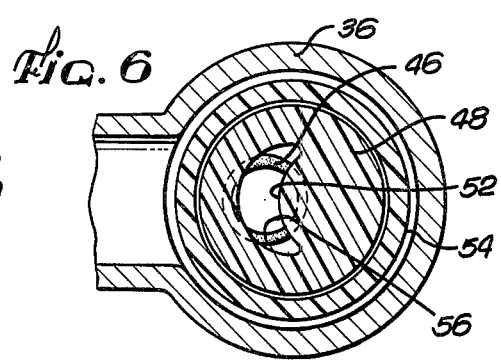
Figure 8:
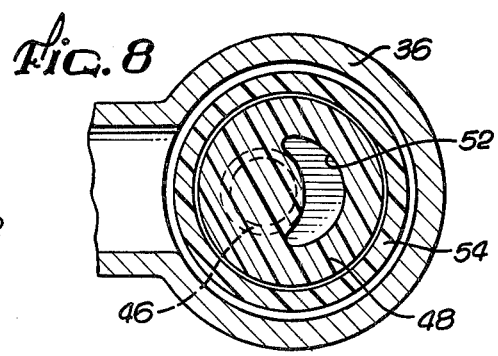
Figure 10:
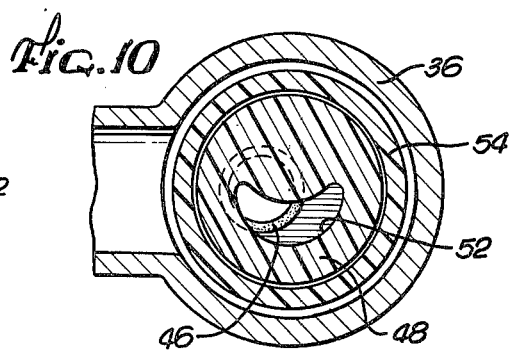

Angular movement of the stem 84 provides increased or decreased registry of the control port 52 with the seal member 46 and, correspondingly increased or decreased water flow. The crescent shape of the port which is best shown in FIGS. 6, 8 and 10, ensures against excessive sensitivity of control. Water that is allowed to pass upwardly through the control opening 52 enters a transverse opening 118 in the stem 84 and then flows outwardly through slots 120 in the cage and then to the casting chamber 26 and the spout. The transverse opening 118 of the stem continuously communicates with the slots 120 of the cage since at this region an annular gap is joined between the parts.

In order to turn the stem 84, an operator 122 is provided. In the present instance, the operator is a knob. The stem 84 projects upwardly past the cylindrical part 114 of the cage and with substantial peripheral clearance, beyond a cup part 124 of the cage. The actual connection between the stem 84 and the knob 122 is provided by a pair of spring prongs or arms 126 and 128 which extend upwardly in side-by-side relationship from the central part 112 of the stem 84. The prongs each have a generally rectangular cross sectional configuration. Together, they fit an elongated square or rectangular hole 130 (FIG. 4) at a recessed hub 132 of the knob. The hole 130, being non-circular, provides the requisite angular coupling. Axial separation is normally prevented by a latching connection between the prongs 126 and 128 and the knob hub 132. For this purpose, the prongs are stepped at their outwardly facing surfaces to provide shoulders 134 and 136. The shoulders are positioned to overlie edges at the top of the hole 130. By pinching or squeezing the prongs 126 and 128 together, the latching shoulders 134 and 136 release the knob 122 so that it can be removed. To replace the knob, it is merely necessary to move the hub 132 downwardly over the prongs. For this purpose, the outwardly facing surfaces of the prongs are sloped, as at 138 and 140 to act as ramps or cams automatically to move the prongs together until the shoulders 134 and 136 snap in place. The prongs project upwardly past the hub 132, almost to the top of the knob. A readily removable plate 142 fits the top of the knob 122 and conceals the cartridge.

In order for the knob 122 to turn the stem 84, the cage 92 in which the stem is mounted, must be confined in the casting 22. For this purpose, the upper cup part 124 of the cage 92 has a pair of spring fingers 144 (FIG. 4) on diametrically opposite side walls that snap into an internal annular groove 146 near the upper end of the casting cup 36. The cage has a top flange 148 that overlies the edge of the casting. Lugs 150 (FIGS. 2 and 4) beneath the flange 148 and on the outside of the cage fit into slots 152 at the top of the casting thus to hold the cage against angular movement. The internal groove 146 that axially locates the cartridge need not be positioned with any critical tolerances because the cylindrical recess 32 for the plug 60 acommodates wide variations. An O-ring 154 at the base of the cage cup 124 seals the opening 34.

The upper retaining wall of the groove 146 and the companion surfaces of the spring fingers 144 are bevelled or sloped approximately 45° to the axis of the valve. An outward thrust on the cage thus automatically releases the fingers 144. Since the fingers 144 are quite flexible, only a slight pull on the cage flange 148 is sufficient to cause dislodgement. The O-ring 76 at the inner end offers only slight resistance. Water pressure acting over the area of the inlet recess 24 is quite capable of overcoming the light spring force of the spring fingers 144 and the friction of O-rings 74 and 154. In order to prevent water pressure from dislodging the cartridge, locking sleeve or dog 160 is provided which is the fifth plastic part of the cartridge structure. The lock 160 is essentially tubular. It has a reduced inner end 162 that fits into the cage cup 124 and extends around the stem 84. When so positioned, the inner end 162 of the lock blocks inward movement of the spring fingers 144. Accordingly, while the dog 160 is in position, the cage 92 and associated cartridge parts cannot be removed. The web 164 of the knob 122 around the hub 132 overlies the dog 160 and keeps the dog in place. The dog 160 is outside the O-ring 116 and hence is not exposed to the pressure of water inside the cartridge.

If the knob 122 is removed, the dog 160 can be removed. However, an interlock between the dog 160 and the stem 84 makes it impossible for the dog 160 to be removed if the valve is in fully closed position. The valve must be half open before removal is possible. Thus, if removal of the cartridge is attempted without first closing off the water supply, either removal of the cartridge will be impossible or water will flow at the spout to signal the obvious danger of proceeding until the water supply is turned off. The interlock is achieved in part by a peripheral arcuate groove 166 in the stem 84 located just above the O-ring 116, and just beneath the bases of the prongs 126 and 128. For purposes to be described hereinafter, the groove 166 extends only about half way around the stem. The dog 160 has an internal key 168 that works in the groove 166 (FIG. 2). The top wall of the groove 166 prevents the dog from being removed. However, notch 170 (FIGS. 4 and 5) at the top wall of the groove 166 allows free passage.

Figure 5:
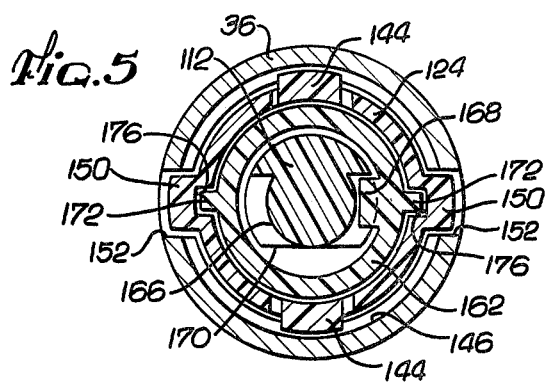
FIGS. 5 and 6 are transverse sectional views taken along planes corresponding to lines 5—5 and 6—6 of FIG. 2, and illustrating the alignment channel of the stem and the lug of the key in the full open position of the valve.
Figure 7:
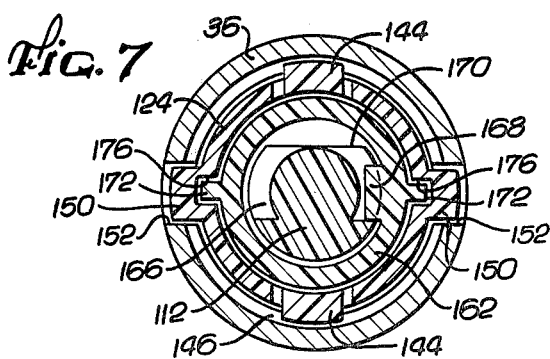
FIGS. 7 and 8 are sectional views similar to FIGS. 5 and 6, but illustrating the lug and channel alignment in the full closed position of the valve.
Figure 9:
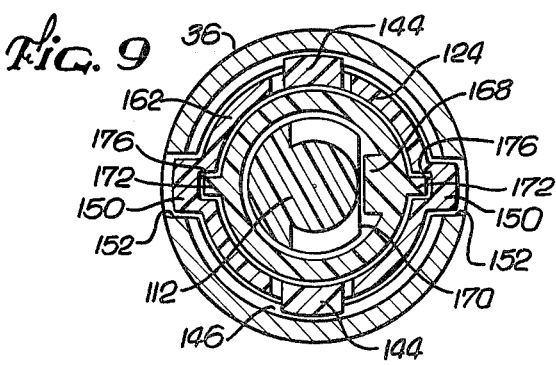
FIGS. 9 and 10 are sectional views similar to FIGS. 5 and 6, but illustrating the lug and channel alignment in the half open or half closed position of the valve, and in which position the parts are required to be for insertion and removal of the locking key.

The notch 170 can be moved into alignment with the key 168 only when the valve is half open (FIGS. 9 and 10). To ensure this result the key 168, first of all, can fit into the cage 92 only if the key is in radial alignment with the seal member 46 carried by the cage 92, and second, the notch 170 of the groove 166 of the stem 84 is 90° out of radial alignment with control port 52 of the stem 84. The relationship is depicted in FIGS. 5 through 10. In FIGS. 5 and 6, the stem 84 is in its clockwise-most position with one end of the groove 166 against the key, with the control port 52 in fully registry and with the key out of registry with the notch 170 so that the dog 160 cannot be removed. In FIGS. 7 and 8, the stem 84 is in its counterclockwise most position with the other end of the groove against the key, with the control port 52 entirely out of registry and, again with key 168 out of registry with the notch 170 so that the dog cannot be removed. In FIGS. 9 and 10, the stem is in its intermediate position with the control port 52 in partial registry and with the key 168 in alignment with the notch 170 so that the dog 160 can be removed.

In order to fix the radial alignment of the dog 160 to the cage 92, the dog 160 has two lugs 172. These lugs are located at diametrically opposite sides beneath the shoulder 174 that forms the reduced inner end 162 of the dog 160. The lugs 172 fit diametrically disposed recesses 176, formed at the inside of the lugs 150. See also FIGS. 5, 7 and 9.

Since there are two lugs 172 and two recesses 176, there are two possible postions of the key 168, one in radial alignment with the seal member 46 on the opposite side as depicted in FIGS. 5 to 10, and another in radial alignment with the seal member 46 on the same side, not shown. By changing the position of the dog relative to the cage, the operation of the handle is reversed. That is to say, instead of clockwise movement turning the valve off, clockwise movement turns the valve on. Counterclockwise movement, instead of turning the valve on, turns the valve off. Thus, a right-hand or left-hand operation can be determined. In either case, alignment of the key occurs when the stem is in an intermediate position.

To assist the removal operation, simple directions can be cast into the top flange of the dog 160, such as "RE-MOVE ONLY IF VALVE HALF OPEN." If the user does not recognize that the flow of water through the spout requires the water supply to be shut off, the user is given extra protection. Thus the pressure of the water actually locks the dog 160 in place. For this purpose, the spring fingers 144 have on their inner surfaces, slight latching projections 178 (FIGS. 3 and 4) that cooperate with the lower edges 180 of two apertures 182 in the sides of the dog 160. In the position of FIG. 3, the water pressure urges the cartridge upwardly, and the sloping side walls of the casting groove 146 cause the spring fingers 144 to move inwardly to the limit allowed by the dog, in which position the projections 178 overlie the edges 180. However, when water pressure is removed, the spring fingers can relax thus to cause the projections 178 to clear.

Intending to claim all novel, useful and unobvious features shown or described, I make the following claims:

1. A valve structure for a plumbing fixture or the like:
   (a) a fixture body having a chamber and walls on opposite sides of the chamber, one of said walls providing a cup and the other of said walls providing an inlet, said cup having an internal annular groove;
   (b) a valve cartridge cooperable with said fixture body;
   (c) said cartridge including a hollow cage made of semi-rigid resilient material, said cage having at least two spring members formed in its side walls normally projecting outwardly to latch said internal groove of said cup axially to locate said cartridge in said fixture body;
   (d) said spring members and said annular groove having engaging surfaces with a cam or ramp configuration to flex the spring members inwardly upon the application of outward pressure on the cage;
   (e) said cartridge including a part mating with said inlet opening;
   (f) valve port and valve closure means carried by the cartridge;
   (g) a stem for said closure means, and having an end accessible at said valve cup; and
   (h) a removable locking member fitting inside the cage to block inward movement of said spring members.

2. The combination as set forth in claim 1 together with an actuator releasably connected to said stem, said actuator when connected to said stem, blocking removal of said locking member.

3. The combination as set forth in claim 1 together with key and slot means between the locking member and said stem for preventing placement and for preventing removal of said locking member except when the stem is in a position to open said valve port.

4. The combination as set forth in claim 1 in which said spring members having projections positioned to overlie edges of said locking member when outward pressure is exerted on said cage by fluid pressure whereby removal of said locking member is prevented until said spring members are relaxed.

5. The combination as set forth in claim 1 together with key and slot means between the locking member and said stem for preventing placement and for preventing removal of said locking member except when said stem is in a position to open said valve port; said spring members having projections positioned to overlie edges of said locking member when outward pressure is exerted on said cage by fluid pressure whereby removal of said locking member is prevented until said spring members are relaxed.

6. The combination as set forth in claim 1 together with registry means between the cage and the cup to prevent angular movement of the cage; registry means between the locking member and the cage to prevent angular movement of the locking member relative to the cage; and key and slot means between the locking member and said stem for preventing placement and for preventing removal of said locking member except when said stem is in a position only partly to open said valve port.

7. The combination as set forth in claim 6 in which said valve port is located eccentrically; said valve closure means being confined against axial movement relative to the cage; said valve closure means having a control opening movable into and out of registry with said valve port in accordance with the angular position of said closure means; arcuate groove means cooperating with said key for limiting movement of said valve stem approximately to 180° between closed and open position; said registry means between said locking member and cage allowing insertion of said locking member at either one of two 180° displaced positions in order to reverse the angular movement of the stem to cause opening and closing movement.

8. The combination as set forth in claim 7 in which said spring members have projections positioned to overlie edges of said locking member when outward pressure is exerted on said cage by fluid pressure whereby removal of said locking member is prevented until said spring members are allowed to relax upon reduction of fluid pressure.

9. The combination as set forth in claim 1 together with an actuator having a non-circular opening into which said stem projects, said stem having bifurcations with latching shoulder means overlying the edges of said actuator opening to prevent removal of said actuator, said bifurcations being capable of inward flexure to free the latching shoulder means from the edges of the actuator opening.

10. The combination as set forth in claim 9 in which the ends of said bifurcations are tapered in order to pilot the actuator opening into position over them and for automatic operation of said latching shoulders.

11. The combination as set forth in claim 1 in which said valve port is located eccentrically; said valve closure means being confined against axial movement relative to the cage; said valve closure having a control opening moveable into and out of registry with said valve port in accordance with the angular position of said closure means; said stem having an external arcuate groove; said locking member having a key in the groove to limit angular movement of the stem approximately to 180° between open and closed position; the top wall of said groove being slotted to allow placement and removal of said locking member only when said stem is in an intermediate position corresponding to partial opening of said valve port.

12. The combination as set forth in claim 11 together with registry means between the locking member and the cage to prevent angular movement of the locking member relative to the cage, said registry means allowing insertion of said locking member at either one of two 180° displaced positions in order to reverse the angular movement of the stem to cause opening and closing movement.

13. The combination as set forth in claim 11 together with an actuator having a non-circular opening into which said stem projects, said stem having bifurcations with latching shoulder means overlying the edges of said actuator opening to prevent removal of said actuator, said bifurcations being capable of inward flexure to free the latching shoulder means from the edges of the actuator opening.

14. The combination as set forth in claim 13 in which the ends of said bifurcations are tapered in order to pilot the actuator opening into position over them and for automatic operation of said latching shoulders.

15. In a valve structure for a plumbing fixture or the like: a valve closure; a stem for the valve closure; means mounting the stem for angular movement about its axis; said stem being made of resilient material; said stem being bifurcated along a substantial length thereof from the outer end of said stem at which said bifurcations are separated from each other, but capable of resilient flexure towards each other upon application of appropriate force; said bifurcations having outer surfaces provided with latching shoulders thereon; and an actuator for said stem having a non-circular bore fitted to said stem, said bore having upper edges over which said shoulders latch to prevent removal of said actuator, flexure of said bifurcations towards each other freeing the actuator for removal from the stem.

16. The valve structure as set forth in claim 15 in which the said outer surfaces of said bifurcations taper towards each other so that the distal ends of said bifurcations can, without flexure of said bifurcations, enter said actuator aperture whereby said shoulders are automatically positioned upon telescoping movement of said actuator over said stem.

17. A valve structure for a plumbing fixture or the like:
(a) a fixture casting having a chamber and walls on opposite sides of the chamber, one of the walls providing a cup and the other of the walls having a bore forming an inlet to the casting chamber, said cup having an internal annular groove coaxial with said bore;
(b) a valve cartridge cooperable with said casting;
(c) said cartridge including a hollow cage made of semi-rigid resilient material, said cage having, integrally formed therefrom, two spring fingers normally projecting outwardly to engage said annular groove;
(d) the outer wall of said annular groove being bevelled in order to flex the spring fingers inwardly upon the application of outward pressure to the cage;
(e) said cartridge having a plug at its inner end that fits said bore;
(f) said cartridge including a seal retainer interposed between the inner end of said cage and said plug, said seal retainer having a recess located eccentrically for accommodating a seal member;
(g) a seal member accommodated in said retainer recess;
(h) said cartridge including a valve stem guided in the cage for angular movement about the valve axis, said valve stem having a closure plate provided with an eccentric control opening movable across the seal member upon angular movement of the valve stem to open and to close the valve structure; and (i) a locking sleeve fitted inside the cage to block that degree of inward movement of said spring fingers sufficient to release the cup while the locking sleeve is in place.

18. The combination as set forth in claim 17 together with a knob or handle releasably connected to said stem, said knob or handle when connected to said stem blocking removal of said locking member.

19. The combination as set forth in claim 17 in which said stem has a peripheral arcuate groove; said locking sleeve having an interior lug accommodated in the groove to limit the stem approximately to 180° angular movement; said stem groove having a slot or notch at the mid position of its upper wall to allow said locking sleeve to be inserted or removed only at one angular position of the stem corresponding to partial valve opening.

20. The combination as set forth in claim 19 together with a pair of registry lugs on opposite sides of the locking sleeve, said cage having a pair of registry lugs for said locking lugs, and allowing insertion of said locking sleeve at either one of two 180° displaced positions in order to provide a left or right hand stem movement.

21. The combination as set forth in claim 17, 18, 19 or 20 in which said spring fingers have projections positioned to overlie edges of said locking sleeve when outward pressure is exerted on said cage by fluid pressure whereby removal of said locking sleeve is prevented until said spring fingers are allowed to relax upon reduction of fluid pressure.

* * * * *